United States Patent [19]

Meuleman

[11] Patent Number: 4,753,508
[45] Date of Patent: Jun. 28, 1988

[54] OPTICAL COUPLING DEVICE

[75] Inventor: Lambertus J. Meuleman, Eindhoven, Netherlands

[73] Assignee: U.S. Philips Corp., New York, N.Y.

[21] Appl. No.: 487,405

[22] Filed: Apr. 21, 1983

[30] Foreign Application Priority Data

May 14, 1982 [NL] Netherlands ............... 8202008

[51] Int. Cl.[4] .................. G02B 6/36; H01J 5/16
[52] U.S. Cl. ...................... 350/96.20; 350/96.18; 350/96.21; 350/96.15; 250/227
[58] Field of Search .......... 350/96.10, 96.15, 96.16, 350/96.18, 96.20, 96.21; 250/227

[56] References Cited

U.S. PATENT DOCUMENTS

| | | | |
|---|---|---|---|
| 3,299,306 | 1/1967 | Kapany | 350/96.15 |
| 3,416,089 | 12/1968 | Koester et al. | 350/96.15 |
| 3,950,075 | 4/1976 | Cook et al. | 350/96.18 |
| 4,257,672 | 3/1981 | Balliet | 350/96.18 |
| 4,265,511 | 5/1981 | Nicia et al. | 350/96.18 |
| 4,282,527 | 8/1981 | Winderman et al. | 350/96.18 |
| 4,285,570 | 8/1981 | Minemura et al. | 350/96.15 |
| 4,365,864 | 12/1982 | Cowley et al. | 350/96.16 |
| 4,451,115 | 5/1984 | Nicia et al. | 350/96.18 |
| 4,632,505 | 12/1986 | Allsworth | 350/96.21 |
| 4,707,067 | 11/1987 | Haberland et al. | 350/96.20 |

FOREIGN PATENT DOCUMENTS

| | | | |
|---|---|---|---|
| 0094710 | 2/1986 | European Pat. Off. | 350/96.20 X |
| 2750332 | 4/1979 | Fed. Rep. of Germany | 350/96.20 X |
| 54-56850 | 5/1979 | Japan | 350/96.16 |
| 54-56849 | 5/1979 | Japan | 350/96.16 |
| 1466486 | 3/1977 | United Kingdom | 350/96.20 X |
| 2034883 | 6/1980 | United Kingdom | 350/96.20 X |

OTHER PUBLICATIONS

Nosu et al, "Slab Waveguide . . . Optical Fibres", Electronics Lett., 7/80, vol. 16, No. 15, pp. 608–609.
Miller, R. C. et al., "Optically Powered Speech Communication over a Fiber Lightguide," *The Bell System Technical Journal*, vol. 58, No. 7, pp. 1735–1741 (Sep. 1979).

*Primary Examiner*—William L. Sikes
*Assistant Examiner*—Brian M. Healy
*Attorney, Agent, or Firm*—Jack E. Haken; Thomas A. Briody

[57] ABSTRACT

A coupling device for coupling an end of a light-conducting fiber to an optical transmitter device and an optical receiver device. The receiver device comprises a light-collecting element arranged opposite an end face of the fiber end. The receiver is provided with an opening. The transmitter device comprises a transmitter element arranged opposite the opening behind the light-collecting element. A transmitter lens is provided for focussing light emitted by the transmitter device onto the end surface of the fiber end. In order to obtain a construction which can be coupled in a simple manner, a transparent body optically coupled to the fiber end, the light-collecting element and the transmitter element is arranged between the fiber end face and the light-collecting element body has reflecting side faces. As a result, substantially all the light emanating from the fiber end strikes the light-collecting element.

5 Claims, 1 Drawing Sheet

OPTICAL COUPLING DEVICE

BACKGROUND OF THE INVENTION

The invention relates to an optical coupling device for coupling an end of a light-conducting fiber to an optical transmitter device and an optical receiver device. The receiver device comprises a light-collecting element arranged opposite an end face of the fiber end. A front side of the light collecting element has an opening facing the fiber end. The transmitter device comprises a transmitter element located on the back side of the light-collecting element, remote from the fiber end and opposite the opening. A transmitter lens is provided to focus light emitted by the transmitter element onto the end face of the fiber end.

Such a device is described in an article entitled "Optically Powered Speech Communication Over a Fiber Lightguide" by R. C. Miller, et al (*The Bell System Technical Journal*, Volume 58, No. 7 (Sept. 1979), pp. 1735-1741). The known coupling device comprises a comparatively large number of optical components which must be aligned accurately with respect to each other. As a result, the operation of mounting this coupling device is time-consuming and expensive.

SUMMARY OF THE INVENTION

It is an object of the invention to provide a coupling device which has a comparatively simple construction and which can be rapidly and readily manufactured as compared with the known coupling device.

In the coupling device according to the invention, a transparent optical element is arranged between the end face of the fiber end and the front side of the light-collecting element. The transparent optical element has side faces which are at least partly reflecting. The transparent optical element is arranged such that substantially all the light emanating from the fiber end strikes the light-collecting element.

The transparent optical element may be, for example, a cylindrical glass rod. The cylindrical surface of the rod is coated with a reflective layer so that the light emanating from the fiber end invariably impinges on the light-collecting element without accurate alignment being necessary. Only the transmitter lens should be positioned so that the light emitted by the transmitter element is focussed onto the end face of the fiber end.

The transmitter lens can be aligned in a very simple manner in a preferred embodiment of the coupling device according to the invention. In this embodiment, the transmitter element is coupled to the transparent body by means of a detachable coupling. The detachable coupling comprises a first plug part with a first ball lens serving as the transmitter lens. The first plug part can be detachably secured in a plug holder rigidly connected to the transparent body.

The detachable coupling can be of the type described, for example, in U.S. Pat. No. 4,451,115. Alignment is then performed by the precedure described for these couplings.

In a further preferred embodiment of the coupling device according to the invention, the end of the light-conducting fiber is coupled to the transparent body by means of a detachable coupling. The detachable coupling comprises a second plug part with a second ball lens. The second plug part can be detachably secured in a plug holder rigidly connected to the transparent body and accommodating a third ball lens. When the second plug part is connected to the plug holder, the second and third ball lenses form an optical imaging system designed for imaging approximately the end face of the fiber end on the front face of the transparent body. This embodiment can be very readily attached and detached.

DESCRIPTION OF THE PREFERRED EMBODIMENTS

Figure 1:
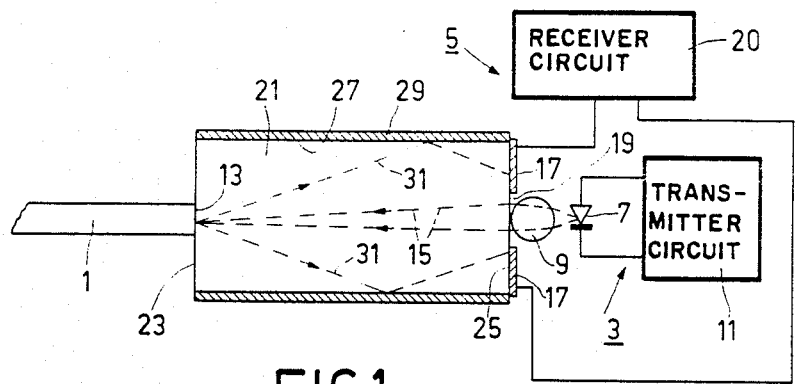
FIG. 1 is a schematic representation of a first embodiment of an optical coupling device according to the invention.

The optical coupling device shown schematically in FIG. 1 can be used to couple an end 1 of a light-conducting fiber to both an optical transmitter device 3 and an optical receiver device 5. The transmitter device 3 comprises a transmitter element 7, for example in the form of a semiconductor laser, and a transmitter lens 9. The transmitter element 7 is controlled by a transmitter circuit 11.

Light emitted by element 7 is focussed by the transmitter lens 9 onto an end face 13 of the fiber end 1. The light beam travelling from the transmitter element 7 to the end face 13 is indicated by dotted lines 15.

The receiver device 5 comprises a light-collecting element 17 arranged opposite the end face 13 of the fiber end 1. Light-collecting element 17 is provided with an opening 19 and is electrically connected to a receiver circuit 20. The front side of the light-collecting element 17 (in FIG. 1 the left-hand side) faces the fiber end 1.

The transmitter lens 9 and the transmitter element 7 are located on the rear side of the light-collecting element 17, opposite the opening 19.

The light-collecting element 17 is made up of a number of photosensitive elements, for example photosensitive diodes. If desired, element 17 may also consist of a single photosensitive element with a central opening 19.

In the example described here, the light-collecting element 17 extends in a plane perpendicular to the longitudinal axis of the fiber end 1. However, it may alternatively enclose an acute angle with this axis or it may be curved in the form of a cup with the concave side facing the fiber end 1.

Between the end face 13 of the fiber end 1 and the front side of the light-collecting element 17 there is arranged a transparent optical element, body 21. Body 21 is optically coupled on its front side (left-hand side in FIG. 1) to the end face 13 with, for example, a suitable adhesive or a coupling liquid.

On the rear side, the transparent body 21 is optically coupled to the front side of the light-collecting element 17 and to the transmitter element 7. For this purpose, the photosensitive elements constituting the light-collecting element 17 are secured against the rear surface 25 of the transparent body with, for example, a suitable cement. The transmitter element 7 is coupled to body 21 through the transmitter lens 9 and the opening 19 in element 17.

The side faces 27 of the body 21 are made reflective by, for example, the application of a metal layer 29.

The body 21 may consist of, for example, a rod of glass or a rod of synthetic resin in the form of a cylinder or a prism.

Due to the fact that the side faces 27 are reflective, substantially all the light emanating from the fiber end 1 is conducted to the light-collecting element 17. By way of example, the paths of two light beams 31 from fiber end 1 are indicated in dotted lines. Since the light emanates at a limited angle to the axis of the fiber end 1, it cannot strike the parts of the side faces 27 located in the immediate proximity of the front surface 23. Thus, it is not absolutely necessary for the reflective layer 29 to extend as far as the front surface 23.

The only light from fiber end 1 that is lost when striking the light-collecting element 17 is the light which is incident upon the opening 19 provided in the light-collecting element. When the surface area of this opening is made small with respect to the overall surface area of the light-collecting element, this loss can be reduced to a very small percentage.

Figure 2:
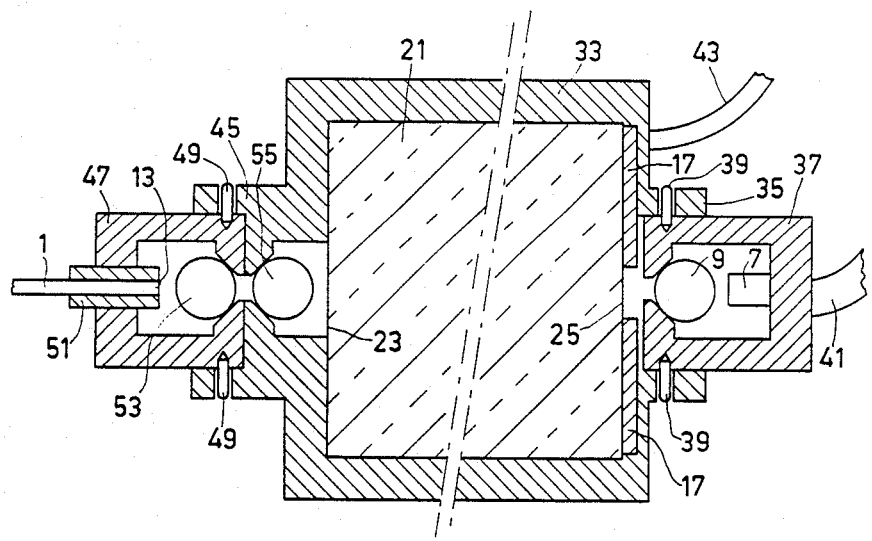
FIG. 2 is a longitudinal sectional view of a second embodiment of a coupling device according to the invention.

FIG. 2 is a longitudinal sectional view of a second embodiment, of the invention. The parts corresponding to parts of the embodiment shown in FIG. 1 are denoted by the same reference numerals as in FIG. 1. The transparent body 21 is secured in this embodiment in a metal housing 33. On the rear side of body 21 (the right-hand side in FIG. 2) a first annular plug holder 35 is formed. This plug holder 35 and a first plug 37 form a first detachable coupling.

The first plug 37 comprises radially projecting pins 39. Together with L-shaped slots in the plug holder 35, pins 39 form a high-speed bayonette coupling.

The first plug 37 accommodates the transmitter element 7 and a first ball lens constituting the transmitter lens 9. The transmitter element is connected through a cable 41 to the transmitter circuit 11. (See FIG. 1.)

The plug holder 35 and plug 37 of the detachable coupling are manufactured according to the design of a known ball lens coupling. A large number of such couplings are known. (See, for example, U.S. Pat. Nos. 4,265,511 and 4,451,115.) In order to avoid repetition, the constructional details will not be described further herein. It should only be noted that, as far as the known couplings are adapted to couple light-conducting fibers, in the present case the transmitter element 7 takes the place of the end of the light-conducting fiber.

Returning to FIG. 2, the light-collecting element 17 is situated between the rear wall of the housing 33 and the rear surface 25 of the transparent body 21. It is connected through a cable 43 to the receiver circuit 20. (See FIG. 1.)

On the front side of the housing 33 (the left-hand side of FIG. 2), there is a second annular plug holder 45. Together with a second plug 47, plug holder 45 forms a second detachable coupling. The second plug 47 comprises radially projecting pins 49. Together with L-shaped slots in the plug holder 45, pins 49 form a high-speed bayonette coupling.

The second plug 47 accommodates the fiber end 1 secured in the fiber holder 51. The second plug 47 also comprises a second ball lens 53 and completely corresponds to known plugs.

In the second plug holder 45 there is a third ball lens 55. Third ball lens 55 and second ball lens 53 form an optical imaging. This system images the end face 13 approximately to scale on the front surface 23 of the transparent body 21.

Due to this construction, the connection between the fiber end 1 and the transparent body 21 can be rapidly and readily established and interrupted and a satisfactory optical coupling between the fiber end and the transparent body is guaranteed.

Figure 3:
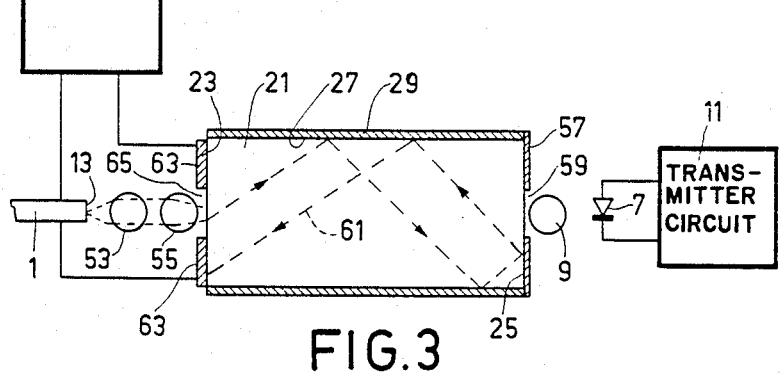
FIG. 3 is a schematic representation of a third embodiment of a coupling device according to the invention.

FIG. 3 schematically shows a third embodiment of the invention. Corresponding parts are again denoted by the same reference numerals as used in FIG. 1. In this embodiment, the light-collecting element is the rear surface 25 of the transparent body 21. For this purpose, the rear surface 25 is made reflective by the application of a reflecting metal layer 57. Layer 57 can be provided simultaneously with the metal layer 29 on the side face 27. The reflecting layer 57 is provided with an opening 59 which has the same function as the opening 19 in the light-collecting element 17 shown in FIG. 1.

A light beam 61 (indicated in dotted lines) emanating from the fiber end 1 through the ball lenses 53 and 55 reaches, after one or more reflections on the side face 27, the rear surface 25. Unless beam 61 strikes the opening 59, it is then reflected back toward the front surface 23.

One or more photosensitive elements 63 (for example, photosensitive diodes) are secured against the front surface 23. An opening 65 is provided for passing the light travelling from the fiber end 1 to the transparent body 21. The light beam 61 strikes, unless it is incident upon the opening 65, the photosensitive element 63. Element 63 is electrically connected to the receiver circuit 20.

When the openings 59 and 65 are sufficiently small with respect to the surfaces of the light-collecting element 57 and of the photosensitive element 63, the percentage of light that is lost through these openings is negligible.

The optical coupling device according to the invention, a few embodiments of which have been described above, may be used, for example, in a transmitter/receiver device for communication in two directions. Alternatively, the device may be used to supply power to the transmitter circuit. Energy is supplied through the light-conducting fiber in the form of light. This energy is converted in the receiver circuit into electrical energy for powering the transmitter circuit. As a result the transmitter circuit can operate independent of local energy sources.

What is claimed is:

1. An optical coupling device for coupling an end of a light-conducting fiber to an optical transmitter and to an optical receiver, said coupling device comprising:

a transparent optical element having first and second opposite ends and having side faces between the ends, at least part of the side faces being reflective;

an optical fiber end having an end face arranged at and optically coupled to the first end of the transparent optical element;

an optical transmitter element arranged at the second end of the transparent optical element;

a transmitter lens arranged between the optical transmitter and the second end of the transparent optical element, said lens being arranged to focus light from the transmitter element through the transparent optical element and onto the end face of the optical fiber end; and a light-collecting element arranged at and optically coupled to the second end of the transparent optical element, said light-collecting element having an opening therethrough between the transparent optical element and the transmitter lens.

2. An optical coupling device as claimed in claim 1, further comprising:
   a first plug in which the transmitter element and transmitter lens are arranged; and
   a plug holder rigidly connected to the second end of the transparent optical element, said plug holder detachably connected to the first plug.

3. An optical coupling device as claimed in claim 2, further comprising:
   first and second ball lenses;
   a second plug in which the optical fiber end and the first ball lens are arranged; and
   a second plug holder rigidly connected to the first end of the transparent optical element, said second plug holder detachably connected to the second plug;
   characterized in that the first and second ball lenses are arranged in the second plug and the second plug holder such that the end face of the fiber is imaged approximately to scale on the first end of the transparent optical element.

4. An optical coupling device as claimed in claim 3, characterized in that the light-collecting element is secured against the second end of the transparent optical element.

5. An optical coupling device as claimed in claim 4, characterized in that the light-collecting element comprises:
   a reflective coating on the second end of the transparent optical element; and
   a photosensitive element secured to the first end of the transparent optical element.

* * * * *